UNITED STATES PATENT OFFICE 2,288,522

DYESTUFFS OF THE DIOXAZINE SERIES AND PROCESS OF PREPARING THEM

Heinrich Greune and Max Thiele, Frankfort-on-the-Main, Gerhard Langbein, Hofheim in Taunus, and Fritz Maennchen, Frankfort-on-the-Main, Germany, assignors to General Aniline & Film Corporation, a corporation of Delaware No Drawing. Application October 25, 1939, Serial No. 301,156. In Germany October 28, 1938

6 Claims. (Cl. 260—246)

The present invention relates to dyestuffs of the dioxazine series and to a process of preparing them; more particularly it relates to dyestuffs of the following general formula:

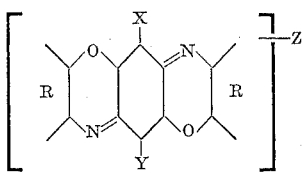

wherein X stands for hydrogen, halogen or methyl, Y for hydrogen or halogen, R represents an aromatic or heterocyclic radical containing at least one carboxyl group, but containing no hydroxyl group in adjacent position to the carboxyl group and no sulfonic acid group, and Z stands for hydrogen or sulfonic acid groups.

We have found that dyestuffs of valuable properties are obtained by heating in an organic solvent in the presence or absence of organic or inorganic oxidizing agents or metal chlorides or acylating agents, diarylamino-1-4-benzoquinone carboxylic acids which may contain instead of the carboxyl group another group capable of being transformed into the carboxyl group by saponification, such as, for instance, the nitrile, carboxylic acid ester or carboxylic acid chloride group and which contain no hydroxyl group in adjacent position to the carboxyl group and no sulfonic acid group, or substitution products thereof, then saponifying the groups capable of being saponified so as to form carboxyl groups and, if desired, sulfonating the compounds thus obtained.

In some cases it is also possible to prepare similar dyestuffs by treating the parent materials mentioned above in an aqueous solution with oxidizing agents, or by treating the said parent materials with strong sulfuric acid, chlorosulfonic acid, fluorosulfonic acid or fuming sulfuric acid, in the presence or absence of oxidizing agents, and, if desired, heating the products thus obtained with dilute acids.

The same dyestuffs may also be obtained by heating in an organic solvent in the presence or absence of acid-binding agents or organic or inorganic oxidizing agents or metal chlorides or acylating agents 1.4-benzoquinones with aromatic aminocarboxylic acids which may contain, instead of the carboxyl groups, another group capable of being transformed into the carboxyl group by saponification and which contain no hydroxyl group in adjacent position to the carboxyl group and no sulfonic acid group, then saponifying the groups capable of being saponified so as to form carboxyl groups and, if desired, sulfonating the compounds thus obtained.

The alkali metal salts of the new dyestuffs thus obtained are soluble in water and may be used for dyeing vegetable, artificial and animal fibers as well as mixed fabrics. The dyeings thus obtained have various shades and are distinguished by very good properties of fastness, particularly by very good fastness to wet-processing. In the form of the barium, calcium or another suitable salt the dyestuff carboxylic acids may also be used as pigments.

The following examples serve to illustrate the invention, but they are not intended to limit it thereto; the parts are by weight:

(1) 10 parts of 2.5-di-(4''-carboxydiphenyl-4'-amino) - 3.6 - dichloro-1.4-benzoquinone (obtainable, for instance, by condensing 4-aminodiphenyl-4'-carboxylic acid with chloranil in aqueous alcohol with addition of sodium acetate) are heated to boiling for 5 hours in 150 parts of nitrobenzene with addition of 10 parts of benzoyl chloride and 10 parts of para-toluene-sulfochloride. After cooling, the whole is filtered with suction and washed with nitrobenzene and alcohol.

The dyestuff is obtained in the form of a dark powder and dissolves in the form of an alkali salt in water to a red-violet solution, from which vegetable, artificial and mixed fabrics are dyed intense red-violet tints. It corresponds with the following formula:

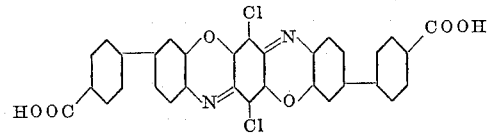

A similar dyestuff is obtained if instead of the above-named parent material the product obtainable by condensing 4-amino-diphenyl-3-carboxylic acid with benzoquinone in alcohol is used.

(2) 10 parts of 2.5-di-(6'-carboxynaphthyl-2'-amino) -3.6- dichloro- 1.4- benzoquinone (obtainable, for instance, by condensing 2-naphthylamine-6-carboxylic acid with chloranil in alcohol) are heated to boiling for 5 hours in 150 parts of nitrobenzene while adding 10 parts of benzoyl chloride and 5 parts of dinitrophenol. After cooling, the whole is filtered with suction and washed with nitrobenzene and alcohol.

The dark product obtained dissolves in dilute sodium carbonate solution to a violet solution from which vegetable and artificial fibers are dyed intense violet tints of good fastness properties.

(3) 10 parts of 2.5-di-(3''-carboxy-diphenylamine-4'-amino)-3.6-dichloro-1.4-benzoquinone (obtainable from 4-aminodiphenylamine-3'-carboxylic acid and chloranil) are heated to boiling in 150 parts of nitrobenzene with addition of 4 parts of para-toluenesulfochloride until the color of the solution has changed to blue. After cooling, the dyestuff formed is filtered with suction, washed with alcohol and water and dried. It is a dark-violet powder which dissolves in concentrated sulfuric acid to a blue solution. In the form of its sodium salt it dyes cotton, viscose, wool, silk and mixed fabrics from neutral solution or a solution alkaline with sodium carbonate clear blue tints of very good properties of fastness.

A similar dyestuff is obtained if instead of the above-named parent material the carboxylic acid ester of 2.5-di-(4''-carboxydiphenylamine-4'-amino)-3.6-dichloro-1.4-benzoquinone is used and the dyestuff is subsequently saponified.

(4) 10 parts of the diethylester of 2.5-di-(3''-carboxy-4''-chlorodiphenylamine-4'-amino)-3.6-dichloro-1.4-benzoquinone (obtainable by condensing chloranil with 4-amino-diphenylamine-4'-chloro-3'-carboxylic acid ethyl ester) are heated to boiling for one hour in 150 parts of nitrobenzene with addition of 30 parts of benzene-sulfochloride. After cooling, the reaction mass is diluted with 300 parts of alcohol, filtered with suction and washed with alcohol. A crystalline product is obtained having a reddish surface luster.

10 parts of the pigment are heated for one hour at 95° C. in 20 parts of sulfuric acid of 75 per cent strength. After cooling, the mixture is poured on ice, filtered with suction, washed with water and the residue is dissolved in dilute sodium carbonate solution. The sodium salt of the dicarboxylic acid is separated by adding sodium chloride, then filtered with suction and dried. The dyestuff thus obtained dissolves in water to a blue solution and dyes vegetable, artificial and animal fibers clear blue tints of good fastness properties.

A similar, somewhat more reddish blue dyestuff is obtained, if instead of the above-named parent material the diethylester of 2.5-di-(3''-carboxy-6''-methyl-diphenylamine-4'-amino)-3-methyl-1.4-benzoquinone is used.

(5) 20 parts of the condensation product from chloranil and 4-aminodiphenylamine-2.4'-dicarboxylic acid (obtainable, for instance, by reaction of the two components in alcohol or water in the presence of an acid binding agent) are dissolved, at room temperature, in 300 parts of sulfuric acid of 80 per cent strength; the solution is then heated to 75° C. and kept at this temperature for 4 hours, the originally yellow-green solution thereby changing its color to a deep blue. The reaction mass is diluted with 1000 parts of water, whereby the blue dyestuff carboxylic acid precipitates; it is filtered with suction, washed with water until neutral and then transformed into the sodium salt. In concentrated sulfuric acid the dyestuff dissolves to a blue, the parent material to a brown solution. The dyestuff dyes the vegetable fiber and viscose blue tints.

(6) 13 parts of chloranil, 28.2 parts of 3-amino-N-ethylcarbazole-6-carboxylic acid ethyl ester and 9 parts of sodium acetate are heated for some time to 120° C. in 300 parts of trichlorobenzene. The mixture is gradually heated to boiling and the acetic acid formed is distilled off. After addition of 20 parts of meta-nitrobenzene-sulfochloride the whole is boiled for one hour, then filtered with suction at 50° C. and washed with trichlorobenzene and alcohol. The dioxazine-dicarboxylic acid ester is obtained in the form of needles having a green surface luster.

10 parts of the pigment are stirred for 10 minutes, at room temperature, in 200 parts of fuming sulfuric acid of 10 per cent strength. The mixture is poured on ice, filtered with suction and washed with water until neutral. The dyestuff which easily dissolves in dilute sodium carbonate solution dyes vegetable, artificial and animal fibers clear blue tints of very good fastness properties.

(7) 10 parts of the diethylester of 2.5-di-(6'-carboxy-N-ethylcarbazolyl-3'-amino)-3.6-dichlorobenzoquinone (obtainable by condensing chloranil with 3-amino-N-ethylcarbazole-6-carboxylic acid ethyl ester in alcohol) are stirred for some time at 150° C. in 200 parts of fuming sulfuric acid of 1 per cent strength. After cooling, the whole is poured on ice, filtered with suction and washed with a sodium chloride solution until neutral. The dyestuff thus obtained is similar to that described in Example 6.

(8) 10 parts of the diethylester of 2.5-di(7'-carboxy-carbazolyl-3'-amino)-3.6-dibromo-1.4-benzoquinone (obtainable, for instance, by condensing bromanil with 3-amino-carbazole-7-carboxylic acid ethyl ester in alcohol) are heated to boiling for 3 hours in 150 parts of nitrobenzene while adding 5 parts of benzoyl chloride and 5 parts of para-toluene-sulfochloride. The whole is filtered with suction while hot and washed with nitrobenzene and alcohol. The dioxazine-diethylester is obtained in the form of needles having a green surface luster.

10 parts of the pigment are stirred for some time at room temperature in 200 parts of fuming sulfuric acid of 5 per cent strength. The mixture is then poured on ice, filtered with suction and washed with water until neutral. The sodium salt of the dyestuff thus obtained is easily soluble and dyes vegetable and artificial fibers clear reddish-blue tints of good fastness properties.

A similar dyestuff is obtained, if instead of the above-mentioned parent material the condensation product from trichlorotoluquinone and 3-amino-carbazole-7-carboxylic acid ethyl ester is used.

(9) 56 parts of 2.5-di-(N-acetic acid-carbazolyl-3'-amino)-3.6-dichloro-1.4-benzoquinone (obtainable by condensing chloranil with 3-amino-carbazole-N-acetic acid in alcohol or aqueous alcohol in the presence of an acid binding agent) are dissolved in 2500 parts of water and mixed with 150 parts of a sodium carbonate solution. An aqueous solution of potassium permanganate is slowly added to the mixture at about 50° C., until a test portion shows a blue coloration. When the reaction is complete, the manganese dioxide is dissolved by adding bisulfite, the dyestuff which has separated is filtered with suction, washed and dried. It dyes cotton, viscose and mixed fabrics fast blue tints.

A similar dyestuff is obtained from the condensation product of bromanil and 3-amino-carbazole-(N)-acetic acid.

(10) 10 parts of the dimethylester of 2.5-di-(8'-carboxy-chrysenyl-2'-amino)-3.6-dichloro- 1.4-benzoquinone (obtainable by condensing chloranil with 2-amino-chrysene-8-carboxylic acid methyl ester in alcohol) are heated to boiling for half an hour in 150 parts of nitrobenzene with addition of 5 parts of benzene-sulfochloride. The reaction product is filtered with suction at 50° C. and washed with nitrobenzene and alcohol. The dyestuff is obtained in the form of small needles having a reddish surface luster.

10 parts of the pigment are stirred for 2 hours, at room temperature, in 200 parts of fuming sulfuric acid of 10 per cent strength. The mixture is poured on ice, filtered with suction and washed with a sodium chloride solution until neutral. The dyestuff obtained dyes vegetable, artificial and animal fibers very clear greenish-blue tints of good properties of fastness.

A similar dyestuff is obtained if the condensation product from chloranil and 3-amino-pyrene-8-carboxylic acid ethyl ester is used as parent material.

(11) 10 parts of the diethylester of 2.5-di-(7'-carboxy - fluorenyl -2'- amino) -3.6-dichloro-1.4-benzoquinone (obtainable by condensing chloranil with 2-aminofluorene-7-carboxylic acid ethyl ester) are heated to 120° C. in 150 parts of nitrobenzene with 10 parts of benzoylchloride. At this temperature 10 parts of manganese dioxide are introduced into the mixture, while stirring, the whole is heated for half an hour to 150° C. and then heated to boiling for a short time. After cooling, the reaction product is filtered with suction and washed with nitrobenzene and alcohol. In order to remove the manganese dioxide which may still be present, the residue is stirred in an acid medium with bisulfite.

10 parts of the dioxazine-dicarboxylic acid ester thus obtained are stirred for ½ to 1 hour, at room temperature, in 20 parts of fuming sulfuric acid of 5 per cent strength. The mixture is then poured on ice, filtered with suction, washed, and the residue is dissolved in dilute sodium carbonate solution. On addition of sodium chloride the sodium salt of the dicarboxylic acid is salted out. It is then filtered with suction and dried.

The dyestuff thus obtained dyes vegetable and artificial fibers clear violet tints of very good fastness properties.

A similar dyestuff is obtained, if instead of the before-mentioned parent material the condensation product from 1 mol of chloranil and 2 mols of 2-amino-diphenyleneoxide-6-carboxylic acid ethyl ester is used.

(12) 10 parts of the condensation product from 1 mol of chloranil and 2 mols of benzoyl-1.4-phenylene-diamine-3'-carboxylic acid methyl ester are heated to boiling for one hour in 150 parts of nitrobenzene while adding 40 parts of para-toluene-sulfochloride. The reaction product is filtered with suction at about 100° C. and washed with nitrobenzene and alcohol. A crystalline product is obtained having a greenish surface luster.

10 parts of the pigment are heated for a few minutes at 90° C. to 95° C. in sulfuric acid of 60° Bé. After cooling, the mixture is poured on ice, filtered with suction, washed with water, and the residue is dissolved in dilute sodium carbonate solution. The sodium salt salted out by means of sodium chloride dyes cotton or viscose clear flue-violet tints of good properties of fastness.

A very similar dyestuff is obtained by treating in the same manner the condensation product from 1 mol of bromanil and 2 mols of benzoyl-1.4- phenylenediamine-4'-carboxylic acid methyl ester.

We claim:

1. The dyestuffs of the following general formula:

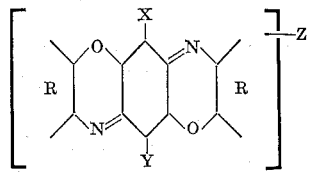

wherein X stands for a member of the group consisting of hydrogen, halogen and methyl, Y for a member of the group consisting of hydrogen and halogen, R represents a member of the group consisting of aromatic and heterocyclic radicals containing at least one carboxyl group, and containing as further substituents a member of the group consisting of hydrogen, alkyl and halogen, and Z means a member of the group consisting of hydrogen and sulfonic acid groups, dyeing in the form of their alkali metal salts vegetable, artificial and animal fibers as well as mixed fibers various shades of very good fastness properties, particularly of very good fastness to wet-processing.

2. The dyestuffs of the following general formula:

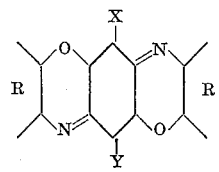

wherein X stands for a member of the group consisting of hydrogen, halogen and methyl, Y for a member of the group consisting of hydrogen and halogen, R represents a member of the group consisting of aromatic and heterocyclic radicals containing at least one carboxyl group, and containing as further substituents a member of the group consisting of hydrogen, alkyl and halogen, dyeing in the form of their alkali metal salts vegetable, artificial and animal fibers as well as mixed fibers various shades of very good fastness properties, particularly of very good fastness to wet-processing.

3. The dyestuffs of the following general formula:

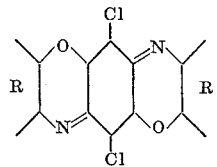

wherein R represents a member of the group consisting of aromatic and heterocyclic radicals containing at least one carboxyl group, and containing as further substituents a member of the group consisting of hydrogen, alkyl and halogen dyeing in the form of their alkali metal salts vegetable, artificial and animal fibers as well as mixed fibers various shades of very good fastness properties, particularly of very good fastness to wet-processing.

4. The dyestuff of the following formula:

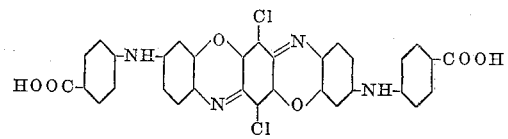

being a dark-violet powder which dissolves in concentrated sulfuric acid to a blue solution and dyes in the form of its sodium salt cotton, viscose, wool, silk and mixed fabrics clear blue shades of very good fastness properties.

5. The dyestuff of the following formula:

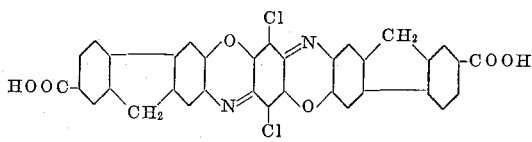

dyeing in the form of its sodium salt vegetable and artificial fibers clear violet shades of very good fastness properties.

6. The dyestuff of the following formula:

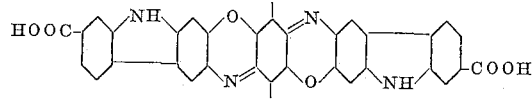

dyeing in the form of its sodium salt vegetable and artificial fibers clear reddish-blue shades of very good fastness properties.

HEINRICH GREUNE.
MAX THIELE.
GERHARD LANGBEIN.
FRITZ MAENNCHEN.